(12) United States Patent
Kaars-Sijpesteijn

(10) Patent No.: US 11,236,837 B2
(45) Date of Patent: Feb. 1, 2022

(54) DUAL DISC NON-SLAM NOZZLE CHECK VALVE

(71) Applicant: Oceaneering International, Inc., Houston, TX (US)

(72) Inventor: Nicholas Willem Kaars-Sijpesteijn, Calgary (CA)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 16/870,318

(22) Filed: May 8, 2020

(65) Prior Publication Data

US 2020/0355283 A1 Nov. 12, 2020

Related U.S. Application Data

(60) Provisional application No. 62/845,042, filed on May 8, 2019.

(51) Int. Cl.
*F16K 15/02* (2006.01)
*F16K 15/12* (2006.01)
(Continued)

(52) U.S. Cl.
CPC .......... *F16K 15/021* (2013.01); *F16K 15/066* (2013.01); *F16K 15/12* (2013.01); *F16K 47/08* (2013.01); *Y10T 137/7841* (2015.04)

(58) Field of Classification Search
CPC ......... Y10T 137/7841; Y10T 137/7838; Y10T 137/3421; F16K 15/066; F16K 15/021; F16K 15/12
See application file for complete search history.

(56) References Cited

U.S. PATENT DOCUMENTS 2,304,991 A * 12/1942 Foster ................. F04B 53/1027
137/454.4
3,856,041 A * 12/1974 Cryder .................... F16K 17/26
137/493.6
(Continued)

*Primary Examiner* — Kevin F Murphy
(74) *Attorney, Agent, or Firm* — Maze IP Law, P.C.

(57) ABSTRACT

Ring disc nozzle check valve 100 allows fluid flow in one direction and can act as a relief valve and comprises valve body 1 which defines valve body fluid passageways 20,22 therethrough; primary seat 2 disposed in valve body fluid passageways 20,22 proximate fluid inlet 30; primary disc 4 disposed in valve body fluid passageways 20,22 proximate fluid inlet 30 and in communication with primary seat 2; secondary disc 5 nested within valve body fluid passageways 20,22, where secondary disc 5 defines secondary seat 3 at a peripheral edge of primary disc 4; diffuser 8 disposed in the valve body fluid passageway 20 proximate fluid outlets 32a,32b; primary spring 10 disposed in valve body fluid passageways 20,22 and in communication with diffuser 8 and primary disc 4, where primary spring 10 is adapted to urge primary disc 4 to a closed position; primary shaft 6 disposed within valve body fluid passageway 22 intermediate diffuser 8 and secondary disc 5, where primary shaft 6 is in communication with diffuser 8 and adapted to support and guide primary disc 4 and allow fluid flow through primary shaft 6; secondary shaft 7 disposed within valve body fluid passageway 22 and configured to support and guide secondary disc 5; secondary spring 11 disposed intermediate secondary shaft 7 and secondary disc 5 and configured to urge secondary disc 5 to a closed position; inner body valve seat support 9, which may act as a retention ring, disposed proximate to fluid outlets 32a,32b and configured to do not disrupt fluid flow within ring disc nozzle check valve 100 as the fluid passes over primary disc 4 and/or secondary disc 5; and one or more fasteners 12 configured to secure retention ring 9 to valve body 1.

16 Claims, 5 Drawing Sheets

FLOW =>
FULL OPEN

(51) Int. Cl.
   *F16K 15/06*     (2006.01)
   *F16K 47/08*     (2006.01)

(56)            References Cited

U.S. PATENT DOCUMENTS

| | | | | |
|---|---|---|---|---|
| 4,420,010 | A * | 12/1983 | Becker | E03C 1/106 |
| | | | | 137/115.21 |
| 6,374,852 | B1 * | 4/2002 | Olivas | F16K 17/30 |
| | | | | 137/493.9 |
| 6,951,209 | B2 * | 10/2005 | Yanase | F02M 25/0836 |
| | | | | 123/516 |
| 9,555,350 | B2 * | 1/2017 | Ardes | B01D 35/147 |

* cited by examiner

FLOW => CLOSED

FLOW =>
PARTIALLY OPEN

FLOW =>
FULL OPEN

DETAIL A

DUAL DISC NON-SLAM NOZZLE CHECK VALVE

RELATION TO OTHER APPLICATIONS

This application claims priority through U.S. Provisional Application 62/845,042 filed on May 8, 2019.

BACKGROUND

Check valves are effectively only used for one purpose, to only allow fluid flow in one direction. Over the years a need has arisen to supply check valves that act as a relief valve as well (i.e., to only allow forward flow once a certain, typically higher, pressure is reached).

The primary advantage of a ring disc nozzle check valve over a solid disc nozzle check valve is improved dynamic performance. By adding a central flow passage, the disc stroke can be reduced with a minimal increase in pressure loss across the valve. In order to accomplish this a second inner valve body seat must be added to the valve body to seal against the inner ring disc seal. The inner valve seat must be supported by vanes which are located at the valve's inlet.

Unfortunately, when the support vanes are typically located at the valve inlet the fluid flow is disturbed at a critical point within the valve, just as the fluid accelerates and passes over the disc, causing disc instability and increased pressure loss. This problem is magnified when the operating pressure increases as the vanes are pressure bearing and must increase in size therefore increasing the magnitude of flow disturbance.

All ring disc style valves on the market use support vanes at the inlet of the valve.

FIGURES

Various figures are included herein which illustrate aspects of embodiments of the disclosed inventions.

DESCRIPTION OF EXEMPLARY EMBODIMENTS

Figure 1:
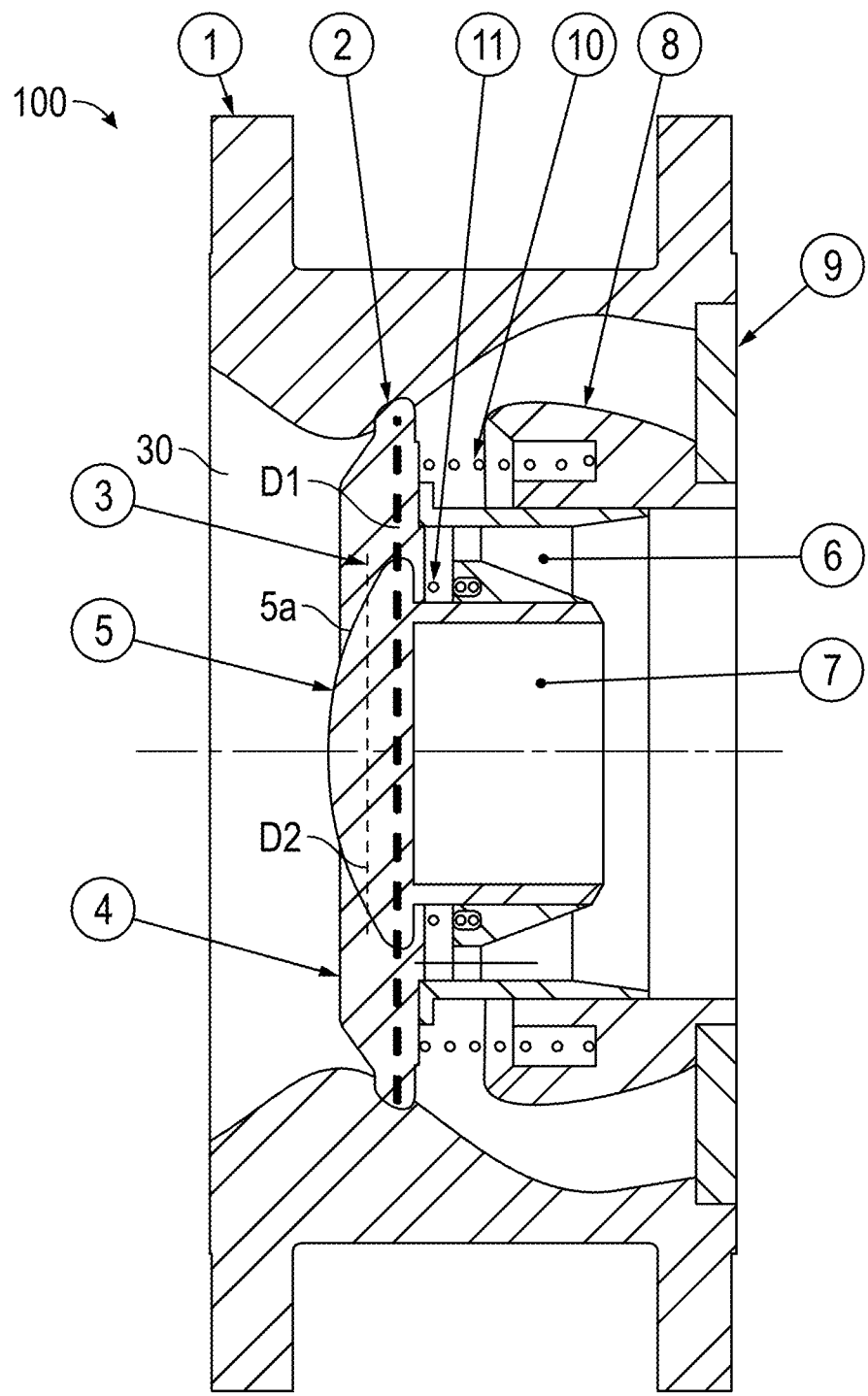
FIG. 1 is a cutaway view in partial perspective of an exemplary embodiment showing a closed state.

In a first embodiment, referring generally to FIG. 1, ring disc nozzle check valve 100 comprises valve body 1 which defines valve body fluid passageways 20,22 therethrough; primary seat 2 disposed in valve body fluid passageways 20,22 proximate fluid inlet 30; primary disc 4 disposed in valve body fluid passageways 20,22 proximate fluid inlet 30 and in communication with primary seat 2; secondary disc 5 nested within valve body fluid passageways 20,22, where secondary disc 5 defines secondary seat 3 at a peripheral edge of primary disc 4; diffuser 8 disposed in the valve body fluid passageway 20 proximate fluid outlets 32a,32b; primary spring 10 disposed in valve body fluid passageways 20,22 and in communication with diffuser 8 and primary disc 4, where primary spring 10 is adapted to urge primary disc 4 to a closed position; primary shaft 6 disposed within valve body fluid passageway 22 intermediate diffuser 8 and secondary disc 5, where primary shaft 6 is in communication with diffuser 8 and adapted to support and guide primary disc 4 and allow fluid flow through primary shaft 6; secondary shaft 7 disposed within valve body fluid passageway 22 and configured to support and guide secondary disc 5; secondary spring 11 disposed intermediate secondary shaft 7 and secondary disc 5 and configured to urge secondary disc 5 to a closed position; inner body valve seat support 9, which may act as a retention ring, disposed proximate to fluid outlets 32a,32b and configured to do not disrupt fluid flow within ring disc nozzle check valve 100 as the fluid passes over primary disc 4 and/or secondary disc 5; and one or more fasteners 12 configured to secure retention ring (9) to valve body (1).

Fluid inlet 32 is disposed axially opposite fluid outlets 32a,32b.

Primary seat 2 typically comprises inner primary seat fluid passageway 22a in fluid communication with valve body fluid passageway 22. In embodiments, primary seat 2 comprises a first material and valve body 1 and/or secondary seat 3 comprises a second material.

Primary disc 4 typically comprises primary disc diameter D1 and defines inner primary disc fluid passageway 20a in fluid communication with valve body fluid passageway 20; a closed position which typically prevents reverse fluid flow; and an open position which allows fluid flow through primary flow passage 20 when in the open position. In certain embodiments, primary disc 4 comprises a ring shape. In most embodiments, primary disc 4 is dimensioned to seat against valve body 1.

Secondary disc 5 typically comprises substantially solid first end 5a comprising a diameter larger than primary disc diameter D1; a closed position which typically prevents reverse fluid flow; and an open position which defines central flow passage 22 when in the open position. In embodiments, secondary disc 5 comprises a circular shape. In most embodiments, secondary disc 5 is dimensioned to seat against inner diameter D2 of primary disc 4.

In certain embodiments, inner body valve seat support 9 comprises one or more support vanes 40 which may be used to support diffuser 8 and other internal components. Typically, support vanes 40 are disposed proximate outlet 32a, 32b where they do not disrupt the flow as fluid passes over primary disc 4 and secondary disc 5.

Typically, each of primary spring 10 and secondary spring 11 comprise a strength customized to obtain a desired opening/closing characteristic, by way of example and not limitation a customized strength that permits opening and closing of primary disc 4 and secondary disc 5 at the same time; permits primary disc 4 to open before secondary disc 5; permits secondary disc 5 to open before primary disc 4; increases a spring rate to increase dynamic performance; decreases a spring rate to decrease a minimum opening flow rate; allows operation with only one disc open of primary spring 10 and secondary spring 11; or the like; or a combination thereof.

As noted above, in contemplated embodiments, inner body valve seat support 9 may act as a retention ring disposed proximate fluid outlet (32a,32b) and configured to support diffuser 8.

In the operation of exemplary methods, referring back to FIG. 1, fluid flow may be controlled using ring disc nozzle check valve 100 by disposing ring disc nozzle check valve 100 in a fluid pathway.

Figure 2:
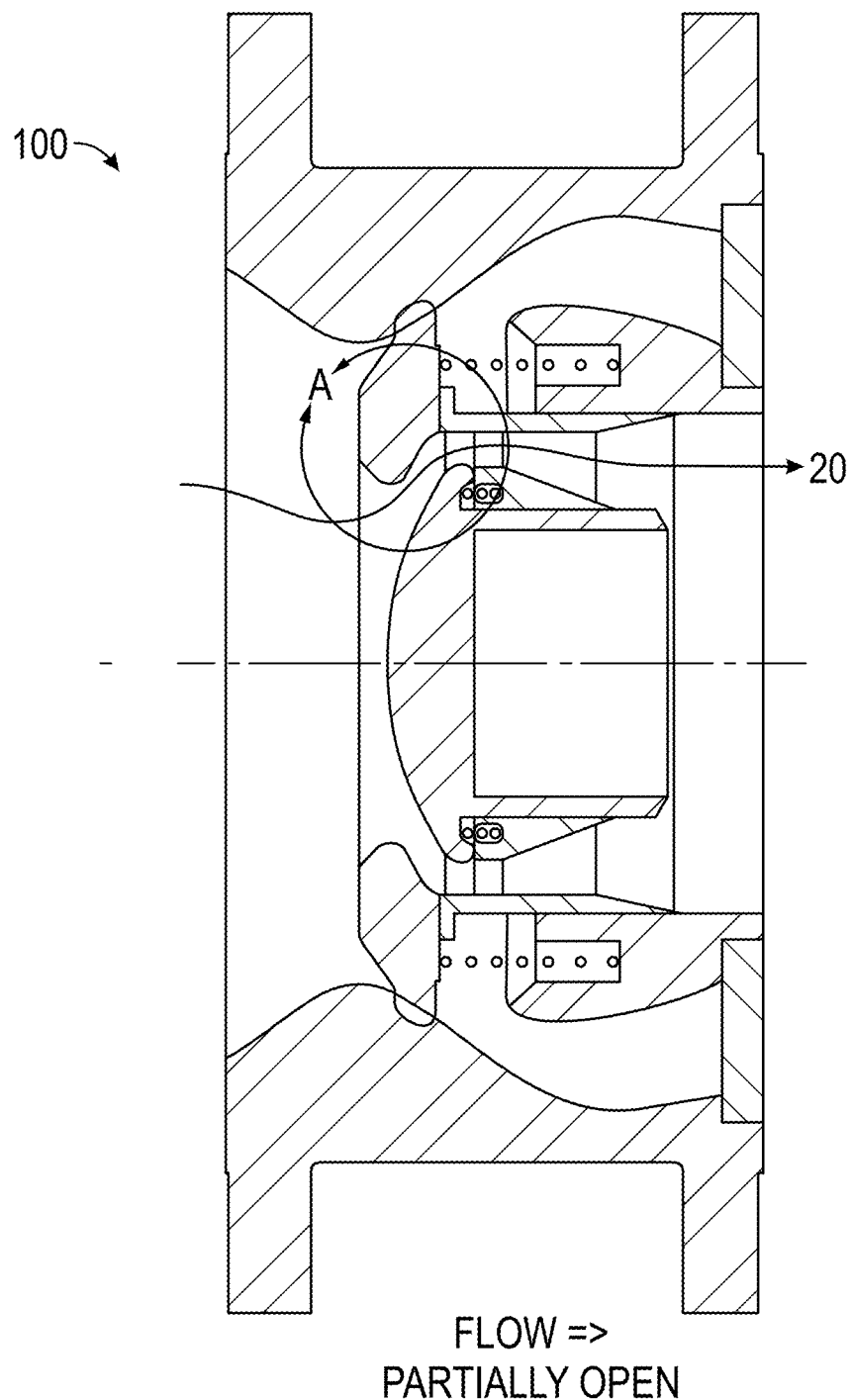
FIG. 2 is a cutaway view in partial perspective of an exemplary embodiment showing a partially open state.
Figure 3:
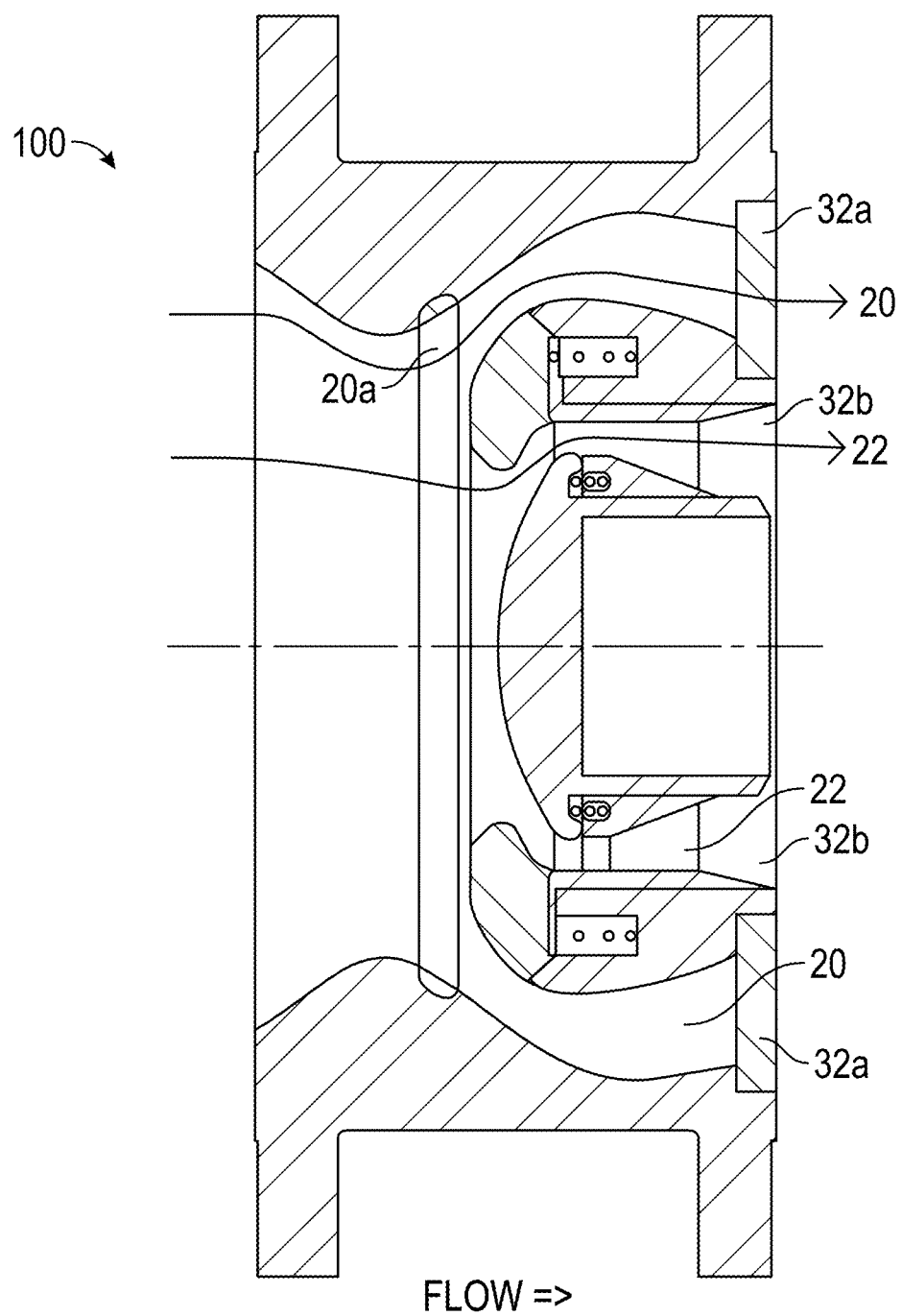
FIG. 3 is a cutaway view in partial perspective of an exemplary embodiment showing an open state.
Figure 4:
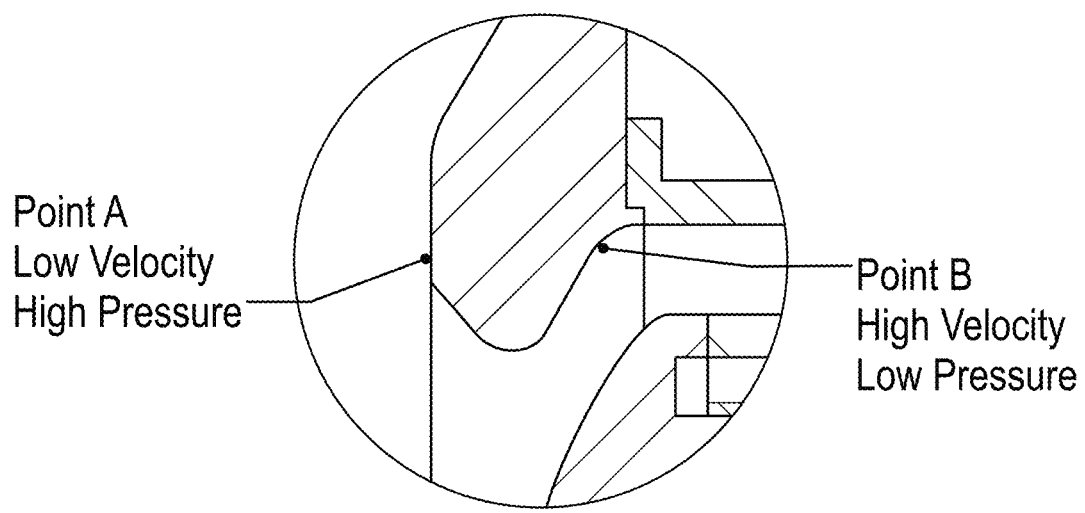
FIG. 4 is a cutaway view in partial perspective of an exemplary embodiment showing a detail of fluid flow pressure and velocity.
Figure 5:
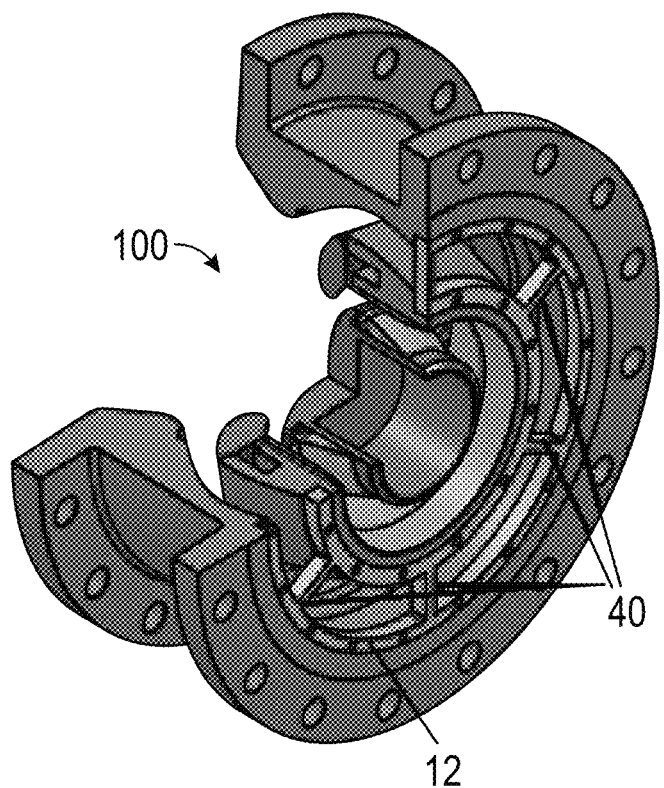
FIG. 5 is a cutaway view in partial perspective of an exemplary embodiment.
Figure 6:
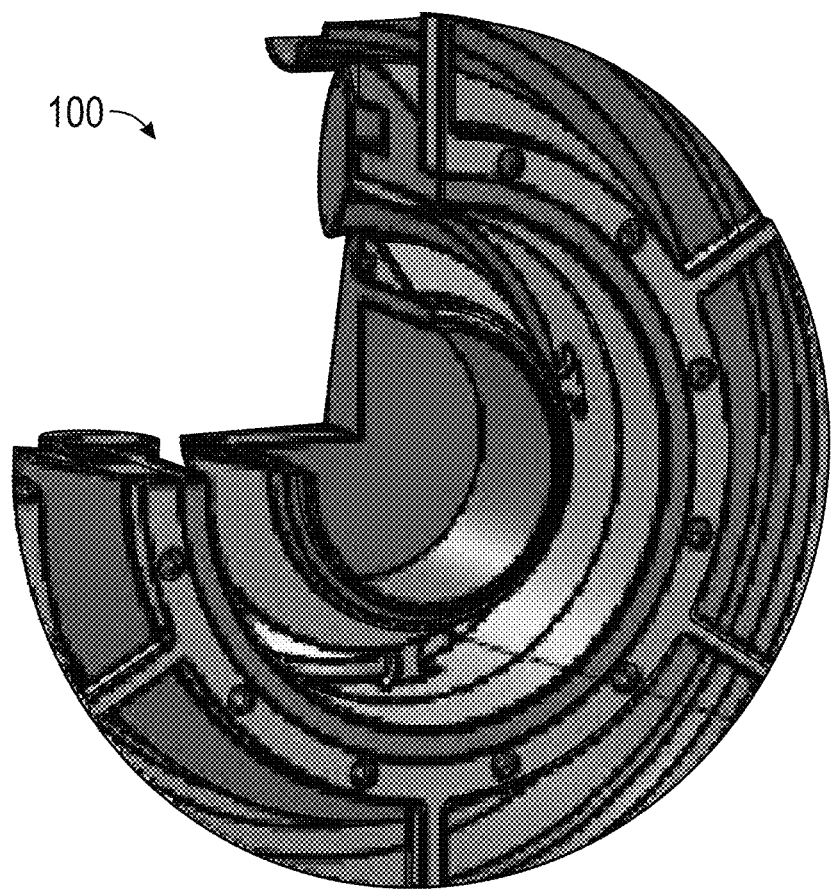
FIG. 6 is a further cutaway view in partial perspective of the exemplary embodiment of FIG. 5.

In general, as the flow accelerates from a stop secondary disc 5 will begin to compress secondary spring 11 and move to its fully open position (FIG. 2). Due to the shape of secondary valve body fluid passageway 22, a relative low-pressure zone is created behind the primary disc (FIG. 4), typically due to a shape of secondary flow passage 22. This low-pressure zone increases the hydraulic force on primary disc 4 and helps to decrease the minimum flow rate required to open ring disc nozzle check valve 100. Once the full opening flow rate is reached, primary disc 4 will fully compress primary spring 10 and rest in its fully open position (FIG. 3) ring disc nozzle check valve 100 will stay in the fully open position at this and higher flower rates.

During fluid deceleration, primary disc 4 and secondary disc 5 will be begin to move towards secondary seat 3 as the fluid flow rate decreases. Primary disc 4 and secondary disc 5 will continue to move towards closed position (FIG. 1) as the fluid decelerates until primary disc 4 and secondary disc 5 contact seats 2 and 3, respectively.

As fluid flow accelerates within valve body fluid passageways 20,22, secondary disc 5 compresses secondary spring 11 and moves to an open position, thereby creating a low-pressure zone behind primary disc 4 which increases hydraulic force on primary disc 4 and decreases a minimum flow rate required to open ring disc nozzle valve 100. Once a predetermined flow rate is reached, primary spring 10 is compressed to rest primary disc 4 in a predetermined open position. Ring disc nozzle valve 100 is maintained in the predetermined open position at fluid flow rates at or greater than the predetermined flow rate.

As noted above, if fluid flow increases, primary disc 4 and secondary disc 5 move towards each disc's respective seat once the fluid reaches the full open flow rate during fluid deceleration and, if fluid flow decreases, primary disc 4 and secondary disc 5 move towards their respective closed position until primary disc 4 and secondary disc 5 contact their respective seats.

Movement of primary disc 4 and secondary disc 5 made be via using primary spring 10 and secondary spring 12 by using secondary disc 5 to compress secondary spring 12 as secondary disc 5 moves to a fully open position and using primary disc 4 to compress primary spring 10 to rest in a predetermined fully open position once a full opening predetermined flow rate is reached.

By utilizing a nested dual disc design, ring disc nozzle check valve 100 helps eliminate a need for an inner valve body seat while still maintaining a short disc stroke for fast dynamic response and allowing flow through a central passage to minimize the pressure loss across the valve.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A ring disc nozzle check valve, comprising:
    a. a valve body defining a valve body fluid passageway therethrough, the fluid passageway comprising:
        i. a fluid inlet; and
        ii. a fluid outlet disposed axially opposite the first fluid inlet;
    b. a primary seat disposed in the valve body fluid passageway proximate the fluid inlet, the primary seat comprising an inner primary seat fluid passageway in fluid communication with the valve body fluid passageway;
    c. a primary disc disposed in the valve body fluid passageway proximate the fluid inlet and in communication with the primary seat, the primary disc comprising:
        i. a primary disc diameter;
        ii. an inner primary disc fluid passageway in fluid communication with the valve body fluid passageway, the inner primary disc fluid passageway defining an inner primary disc edge;
        iii. a closed position; and
        iv. an open position which defines a primary flow passage when in the open position within the valve body fluid passageway;
    d. a secondary disc nested within the valve body fluid passageway, the secondary disc defining a secondary seat at a peripheral edge of the inner primary disc edge, the secondary disc comprising:
        i. a substantially solid first end comprising a diameter larger than the inner primary disc edge of the inner primary disc fluid passageway of the primary disc;
        ii. a closed position; and
        iii. an open position which defines a central flow passage within the valve body fluid passageway when in the open position;
    e. a diffuser disposed in the valve body fluid passageway proximate the fluid outlet;
    f. a primary spring disposed in the valve body fluid passageway and in communication with the diffuser and the primary disc, the primary spring adapted to urge the primary disc to a closed position;
    g. a primary shaft disposed within the valve body fluid passageway intermediate the diffuser and the secondary disc, the primary shaft in communication with the diffuser and adapted to support and guide the primary disc and allow fluid flow through the primary shaft;
    h. a secondary shaft disposed within the valve body fluid passageway and configured to support and guide the secondary disc;
    i. a secondary spring disposed intermediate the secondary shaft and the secondary disc and configured to urge the secondary disc to a closed position;
    j. an inner body valve seat support disposed proximate to the fluid outlet of the valve and configured to allow fluid flow within the valve body as the fluid passes over the primary disc, the secondary disc, or both of the primary disc and the secondary disc; and
    k. a fastener configured to secure the inner body valve seat support to the valve body.

2. The ring disc nozzle check valve of claim 1 wherein the inner body valve seat support comprises a support vane.

3. The ring disc nozzle check valve of claim 1 wherein:
    a. the primary disc comprises a ring shape; and
    b. the secondary disc comprises a circular shape.

4. The ring disc nozzle check valve of claim 1 wherein:
    a. the primary disc is dimensioned to seat against the valve body; and
    b. the secondary disc is dimensioned to seat against the inner diameter of the primary disc.

5. The ring disc nozzle check valve of claim 1 wherein the primary seat comprises a first material and the valve body comprises a second material.

6. The ring disc nozzle check valve of claim 1 wherein the primary disc comprises a first material and the secondary seat comprises a second material.

7. The ring disc nozzle check valve of claim 1, wherein the inner body valve seat support is further configured to support the diffuser.

8. The ring disc nozzle check valve of claim 1, wherein the primary disc in its closed position prevents reverse fluid flow.

9. The ring disc nozzle check valve of claim 1, wherein the secondary disc in its closed position prevents reverse fluid flow.

10. The ring disc nozzle check valve of claim 1, wherein each of the primary spring and the secondary spring comprise a strength customized to obtain a desired opening/closing characteristic.

11. The ring disc nozzle check valve of claim 10, wherein the customized strength comprises a strength that:
   a. permits opening and closing of the primary disc and the secondary disc at the same time;
   b. permits the primary disc to open before the secondary disc;
   c. permits the secondary disc to open before the primary disc;
   d. increases a spring rate to increase dynamic performance;
   e. decreases a spring rate to decrease a minimum opening flow rate; or
   f. allows operation with only one disc open.

12. A method of controlling fluid flow using a ring disc nozzle check valve comprising a valve body defining a valve body fluid passageway therethrough where the fluid passageway comprises a fluid inlet and a fluid outlet disposed axially opposite the first fluid inlet; a primary seat disposed in the valve body fluid passageway proximate the fluid inlet where the primary seat comprises an inner primary seat fluid passageway in fluid communication with the valve body fluid passageway; a primary disc disposed in the valve body fluid passageway proximate the fluid inlet and in communication with the primary seat where the primary disc comprises a primary disc diameter, an inner primary disc fluid passageway in fluid communication with the valve body fluid passageway where the inner primary disc fluid passageway defines an inner primary disc edge, a closed position, and an open position which defines a primary flow passage when in the open position within the valve body fluid passageway; a secondary disc nested within the valve body fluid passageway where the secondary disc defines a secondary seat at a peripheral edge of the inner primary disc edge where the second disc comprises a substantially solid first end comprising a diameter larger than the inner edge of the inner primary disc fluid passageway of the primary disc, a closed position, and an open position which defines a central flow passage within the valve body fluid passageway when in the open position; a diffuser disposed in the valve body fluid passageway proximate the fluid outlet; a primary spring disposed in the valve body fluid passageway and in communication with the diffuser and the primary disc, the primary spring adapted to urge the primary disc to a closed position; a primary shaft disposed within the valve body fluid passageway intermediate the diffuser and the secondary disc, the primary shaft in communication with the diffuser and adapted to support and guide the primary disc and allow fluid flow through the primary shaft; a secondary shaft disposed within the valve body fluid passageway and configured to support and guide the secondary disc; a secondary spring disposed intermediate the secondary shaft and the secondary disc and configured to urge the secondary disc to a closed position; an inner body valve seat support disposed proximate to the fluid outlet of the valve and configured to allow fluid flow within the valve body as the fluid passes over the primary disc and/or the secondary disc; and a fastener configured to secure the inner body valve seat support to the valve body, the method comprising:
   a. disposing the ring disc nozzle check valve in a fluid pathway;
   b. as fluid flow accelerates within the fluid pathway, allowing the secondary disc to compress the secondary spring and move to an open position, thereby creating a low-pressure zone behind the primary disc which increases hydraulic force on the primary disc and decreases a minimum flow rate required to open the ring disc nozzle valve;
   c. once a predetermined flow rate is reached, compressing the primary spring to rest the primary disc in a predetermined open position; and
   d. maintaining the ring disc nozzle valve in the predetermined open position at fluid flow rates at or greater than the predetermined flow rate.

13. The method of controlling fluid flow of claim 12, further comprising:
   a. if fluid flow decreases, allowing the primary disc and the secondary disc to move towards each disc's respective seat as the fluid flow rate decelerates; and
   b. allowing the primary disc and the secondary disc to continue to move towards their respective closed positions as the fluid decelerates until the primary disc and the secondary disc contact their respective seats.

14. The method of claim 12, further comprising further controlling disc movement by using the primary spring and the secondary spring, the method further comprising:
   a. using the secondary disc to compress the secondary spring as the secondary disc moves to a fully open position; and
   b. using the primary disc to compress the primary spring to rest in a predetermined fully open position once a full opening predetermined flow rate is reached.

15. The method of claim 12, wherein creating the low-pressure zone behind the primary disc occurs due to a shape of the secondary flow passage.

16. The method of claim 12, wherein the ring disc nozzle valve is maintained in a fully open position at fluid flow rates at or greater than the predetermined flow rate.

* * * * *